United States Patent [19] [11] 4,206,937
Huston [45] Jun. 10, 1980

[54] SPIRIT DUPLICATING MASTER AND METHOD OF MAKING THE SAME

[75] Inventor: Donald B. Huston, Menasha, Wis.

[73] Assignee: George Banta Company, Inc., Menasha, Wis.

[21] Appl. No.: 906,066

[22] Filed: May 15, 1978

[51] Int. Cl.[2] .......................... B41L 1/36; B05D 5/06; C09D 11/10

[52] U.S. Cl. ...................................... 282/27.5; 106/22; 427/144; 427/261; 428/199; 428/211

[58] Field of Search ............... 428/411, 488, 199, 211; 106/21, 22, 31; 427/144, 261; 282/27.5

[56] References Cited

U.S. PATENT DOCUMENTS

| | | | |
|---|---|---|---|
| 3,962,526 | 6/1976 | Panken | 428/488 |
| 3,979,550 | 9/1976 | Panken | 428/488 |
| 4,005,237 | 1/1977 | Panken | 427/144 X |

*Primary Examiner*—Thomas J. Herbert, Jr.

*Attorney, Agent, or Firm*—Andrus, Sceales, Starke & Sawall

[57] ABSTRACT

A pre-printed spirit duplicating master. A liquid ink composition composed of 40% to 62% by weight of a dye, 40% to 65% by weight of an alcohol soluble polyamid resin having a melting point in the range of 110° C. to 125° C., and 12% to 25% by weight of ethylene glycol is printed in reverse image on one side of a translucent paper sheet. After printing, the ink is dried to evaporate a portion of the ethylene glycol so that the dried ink contains approximately 3.0% to 6.25% by weight of ethylene glycol. The polyamid resin is soluble in alcohol so that multiple copies can be printed from the master using conventional duplicating equipment, and as the ink does not contain oils and greases there is no tendency of the ink to bleed or smear so that the masters can be bound in booklet form without the need of separating tissue sheets. As the sheet is translucent, the printing can be seen in positive image through the sheet so that no positive image printing is required on the front surface of the sheet.

14 Claims, No Drawings

SPIRIT DUPLICATING MASTER AND METHOD OF MAKING THE SAME

BACKGROUND OF THE INVENTION

Spirit duplicating is frequently used in schools for the production of copies of instructional material. In preparing the spirit duplicating master, the instructional material is typed on a transfer sheet containing a hectographic ink on one surface. The typing is then formed in reverse image on the spirit duplicating master by transfer from the transfer sheet.

The conventional spirit duplicating ink used on the masters contains waxes, oils or fatty acids, and a dye such as crystal violet or methyl violet. In the past, when pre-printed masters have been bound in booklet form for use in schools or other instructional programs, the spirit duplicating ink has had a tendency to bleed through the paper to the opposite surface giving a halo effect. In addition, the conventional ink has had a tendency to smear and transfer when contacted. Therefore, spirit duplicating masters, as used in the past, were generally covered with a protective envlope or sheet, and when bound into a booklet form, protective tissue sheets were used to separate the masters.

U.S. Pat. No. 3,962,526 is directed to a spirit duplicating master incorporating an ink composition which reduces bleeding and smearing due to a reduced anount of oil, as compared to other ink compositions. In the ink composition of the aforementioned patent, cetyl alcohol is used in place of the normal fatty acids and oils to solubilize the dyes. However, with the ink composition as described in the aforementioned patent, it is necessary to treat the surface of the paper sheet with an oleophobic material, i.e. grease resistant material, in an attempt to prevent the transfer of ink from the backside of one master to the adjacent front surface of the adjoining master when the masters are bound in booklet form.

Oleophobic paper is opaque, and as such, the reverse image printing on the back surface of the master is not visible through the paper to the front side and therefore, it has been necessary to print the instructional material in positive image on the front side of the master so that the instructional material can be read.

SUMMARY OF THE INVENTION

The invention is directed to an improved spirit duplicating master having an ink composition which will not bleed nor smear, enabling the masters to be bound into booklet form without separating sheets. In the preferred form of the invention, the spirit duplicating ink, in liquid form, is printed in reverse image on a surface of a translucent paper sheet, so that the printing is visible in positive image through the sheet.

The liquid ink composition is composed of 40% to 62% by weight of a dye, 40% to 65% by weight of an alcohol soluble polyamid resin having a melting point in the range of 110° C. to 125° C., and 12% to 35% by weight of ethylene glycol. In addition, up to 2% by weight of a wetting agent can also be included.

After printing on the translucent sheet, the sheet is heated to a temperature above the vaporization temperature of the ethylene glycol to evaporate a portion of the ethylene glycol. The resulting dried ink coating contains in the range of 3.0% to 6.25% ethylene glycol, which provides the dried ink printing with the desired plasticity to prevent cracking.

The polyamid resin serves as a vehicle and is soluble in low molecular weight alcohols, such as ethanol, so that it aids in dispersing the dye when the alcohol dampened sheet from the duplicating equipment is pressed against the master.

As the ink formulation does not contain oils or waxes, there is no tendency for the composition to bleed or smear, particularly when subjected to elevated temperatures during storage, thereby eliminating the need of protective covers for the master and enabling the masters to be bound in booklet form without the need of tissue separating sheets.

As the paper sheet is translucent, the reverse image printing on the backside of the master is visible in positive image on the front surface, so that no positive image print of the instructional material is required on the front surface of the master. By eliminating the positive image printing, a substantial cost savings is realized. While not required, the sheet may, however, be printed on the front side by a conventional printing process, such as offset printing Other objects and advantages of the invention will appear in the course of the following description.

DESCRIPTION OF THE PREFERRED EMBODIMENT

The invention is directed to an improved spirit duplicating master having particular use for educational instruction and composed of a translucent paper sheet having a spirit duplicating ink composition printed in reverse image on one side.

The paper used in preparing the master is commonly available in basis weights of 30 to 70 lb. (24"×36"-500) with a resultant caliper range of 0.002" to 0.005". The paper is characterized by good strength, dimensional stability, and solvent "holdout".

The sheet is uncoated and obtains its strength from the use of a blend of prime bleached kraft softwood and hardwood pulps. The softwood kraft constributes strength while the hardwood promotes uniform formation and smoothness.

The proper degree of ink and/or solvent "holdout" is achieved through a proper blend of refining and size press treatment to yield maximum holdout at high strength levels. The sheet is dampened and heavily supercalendered to yield a very smooth high gloss surface and in this condition is translucent.

The specifications of the paper sheet are as follows:

TABLE I

| TEST | | MIN. | STD. AV. | MAX. |
|---|---|---|---|---|
| Basis weight, g/m$^2$ | | 89.5 | 96.2 | 102.9 |
| Density, g/cc | | 1.05 | 1.11 | 1.16 |
| MIT Folding Endurance | (MD) | 1990 | 2290 | 2640 |
| Double folds at 1 kg. | (CD) | 1341 | 1530 | 1762 |
| Elmendorf tearing resistance, g. | (MD) | 57.8 | 64.2 | 71.6 |
| | (CD) | 54.6 | 76.0 | 85.6 |
| Opacity contrast ratio, % | | 60.0 | 70.0 | 79.0 |
| Permeability parameter pe $\times 10^4$, cm/sec - ½ | Side 1 | 0.62 | 0.70 | 0.81 |
| | Side 2 | 1.23 | 1.46 | 1.65 |
| Surface roughness index h $\times 10^4$, cm | Side 1 | 1.81 | 1.91 | 2.01 |
| | Side 2 | 1.52 | 1.62 | 1.74 |

The above tests, with the exception of the permeability and surface roughness tests, were run according to TAPPI specifications. The permeability parameter and surface roughness index tests were made with the nipspreading apparatus described by Wink and Van den Akker, TAPPI 40, No. 7:528-36 (July, 1957). The permeability parameter (pe) and surface roughness index, (h) were determined by computer using the program described by Hung, Nelson and Van Eperen, TAPPI 52, No. 9.:1732-24 (September, 1969)

As the paper sheet is translucent, the spirit duplicating ink printed in reverse image on one side of the sheet is visible through the sheet as a positive image.

The liquid ink composition, which has an appearance similar to normal printers ink, has the following composition in weight percent:

| | |
|---|---|
| Dye | 40-62% |
| Polyamid resin | 40-65% |
| Ethylene glycol | 12-25% |

Any conventional dye commonly used in spirit duplicating ink can be employed in the composition. The dye may take the form of crystal violet, methyl violet, nigrosine base black, basic black J (L & R Dyestuff Corp.), napththylamine black, a combination of Victoria blue and naphthalamine black, fast blue ARN (Du Pont), fast brown K (DuPont), and the like. Of the above dyes, crystal violet and methyl violet are readily available and are preferred.

The polyamid resin is soluble in low molecular weight alcohols, such as ethanol, and has a melting point in the range of 110° C. to 125° C. In addition, the polyamide resin is miscible with ethylene glycol, and the resin serves as a vehicle to carry or disperse the dye and should not vaporize or decompose at the temperature subsequently used to dry the ink on the master.

The ethylene glycol acts as a solvent in the liquid composition, and in the dried ink coating serves as a plasticizer to prevent cracking of the ink.

The ink formulation can also contain up to 2% of a conventional wetting agent which helps disperse the dye in the polyamid resin vehicle and the ethylene glycol solvent. The wetting agent can take the form of a fatty acid having from 12 to 20 carbon atoms in the molecule, such as stearic acid, palmitic acid, and the like, and has a melting point, generally in the range of about 60° C. to 72° C.

The liquid ink composition has a tack rating in the range of 15 to 20 gram-meters and is preferably printed on the backside of the master by a letter press plate with a raised image. The letter press plate can be formed of a photosensitive polymer in which the image is prepared by exposure to ultra violet light through a photographic negative. The cured photosensitive polymer of the letter press plate should preferably have a Shore durometer hardness in the range of 82 to 85 and a relief image from 0.020 inch to 0.120 inch, to provide the optimum transfer of ink to the master. Alternately, the ink can be applied to the sheet by other types of photosensitive printing plates or screens such as silk screen, flexography or gravure.

After the ink has been printed in reverse image on a surface of the master, the master is dried to evaporate a portion of the ethylene glycol and produce a solid ink printing on the master. The drying is carried out by heating the master to a temperature above the vaporization point of ethylene glycol which is approximately 250° C. The master is maintained at this temperature for a sufficient period of time to vaporize a portion of the ethylene glycol so that the resulting ink printing has an ethylene glycol content in the range of 3.0 to 6.25% by weight.

The drying can be carried out by subjecting the master to infrared radiation, microwave drying, gas flame heating, or the like. The particular method of heating is not critical, but the duration and intensity of the drying should be controlled so that the resulting printed ink has the aforementioned residual concentration of ethylene glycol to provide the dried ink with the desired plasticity.

As the ink composition does not contain oils or greases there is no tendency for the ink to bleed or smear, particularly when subjected to elevated temperatures during storage. Therefore, the masters can be stored and handled without the use of protective covers and can be bound into booklet form without the need of separating tissue sheets. As the polyamid resin vehicle is soluble in lower molecular weight alcohols, it acts to disperse the dye when an alcohol dampened sheet of the duplicating equipment is pressed against the master, thus enabling multiple copies to be printed from the master. The characteristics of the paper sheet, in combination with the properties of the ink, provide the desired "holdout", meaning that the ink will not migrate, to any appreciable degree, into the paper sheet.

As the paper sheet is translucent, the reverse image printing on the master is visible from the opposite side as a positive image, so that no positive image offset printing is required on the front side of the master to enable the printed material to be read.

The following examples illustrate the preparation of the spirit duplicating master of the invention.

EXAMPLE I

The following ink formulation was prepared in weight percent:

| | |
|---|---|
| Crystal violet | 60% |
| Ethylene glycol | 15% |
| Polyamid resin | 23% |
| Stearic acid | 2% |

The ink formulation was printed in reverse image by a letter press plate composed of a cured photosensitive polymer on one surface of a translucent sheet of heavily calendered cellulosic paper having a weight of 55 lbs. and having properties as shown by the STD. AV. in Table I above. After printing, the sheet was placed under infrared radiation for approximately 5 seconds to evaporate a portion of the ethylene glycol. The dried ink contained 3.75% ethylene glycol.

After the sheet was cooled to room temperature, the master was placed on a spirit duplicator and multiple copies were produced from the master.

EXAMPLE II

A spirit duplicating ink composition was prepared having the following formulation in weight percent:

| | |
|---|---|
| Crystal violet | 51% |
| Methyl violet | 5% |
| Ethylene glycol | 18% |
| Polyamid resin | 24% |
| Stearic acid | 2% |

The above ink composition was printed in reverse image on one surface of a paper sheet of the type described in Example I by a letter press plate composed of a cured photosensitive polymer. After printing, the sheet was placed under infrared radiation for approximately 5 seconds to evaporate a portion of the ethylene glycol and produce a residual ethylene glycol content of 4.5%. After cooling the master to room temperature, the master was placed on a spirit duplicator and multiple copies were produced from the master.

EXAMPLE III

The following ink composition was prepared in weight percent:

| | |
|---|---|
| Crystal violet | 55% |
| Ethylene glycol | 20% |
| Polyamid resin | 25% |

The above ink composition was printed in reverse image on the back surface of a paper sheet of the type described in Example I using a letter press plate composed of a cured photosensitive polymer. Subsequently, each sheet was placed under infrared radiation for approximately 5 seconds to evaporate a portion of the ethylene glycol and produce a dried ink containing 5% ethylene glycol. After the printed masters were cooled to room temperature, the masters were placed on a spirit duplicator and multiple copies were produced.

Various modes of carrying out the invention are contemplated as being within the scope of the following claims particularly pointing out and distinctly claiming the subject matter which is regarded as the invention.

I claim:

1. A preprinted spirit duplicating master, comprising a translucent paper sheet having an opacity less than 79%, and spirit duplicating ink printing in reverse image on one side thereof, the opposite side of said sheet being free of printing and said reverse image printing being visible through the sheet in positive image and having no appreciable migration into said sheet, said ink including a polymeric material, printing dyes and ethylene glycol as a plasticizer, said polymeric material being soluble in alcohol and miscible with ethylene glycol.

2. The master of claim 1, wherein the paper sheet is composed of a blend of soft wood and hard wood pulps and has a surface roughness index less than 2.01 $h \times 10^4$ cm.

3. A preprinted spirit duplicating master, comprising an uncoated translucent paper sheet having an opacity less than 79%, and spirit ink printing applied in reverse impage to one side of the sheet and the opposite side of the sheet being free of printing, said reverse image printing being visible through the sheet in positive image and having no appreciable migration into said sheet, said ink comprising a dye selected from the group consisting of a crystal violet, methyl violet and mixtures thereof, an alcohol soluble polyamid resin having a melting point in the range of 100° C. to 125° C. and ethylene glycol as a plasticizer.

4. A pre-printed spirit duplicating master, comprising a translucent paper sheet, and spirit duplicating ink printing in reverse image on one side thereof and said reverse image being visible through the sheet in positive image on said opposite side, said master being prepared by (a) formulating a liquid ink composition comprising by weight 40% to 62% of a dye, 40% to 65% of an alcohol soluble polyamid resin having a melting point in the range of 110° C. to 125° C., and 12% to 25% of ethylene glycol, (b) printing said ink composition on said one side of the sheet, and (c) thereafter evaporating a portion of the ethylene glycol to reduce the ethylene glycol in the dried ink to a value in the range of 3.0% to 6.25% by weight.

5. A method of preparing a spirit duplicating master, comprising the steps of formulating a liquid ink composition comprising by weight 40% to 62% of a dye, 40% to 65% of an alcohol soluble polyamid resin having a melting point in the range of 110° C. to 125° C., and 12% to 25% of ethylene glycol, printing said ink composition of a surface of a sheet in reverse image to provide a master, and heating the master to a temperature above the vaporization temperature of the ethylene glycol to reduce the ethylene glycol content in the dried ink to a value in the range of 3.0% to 6.25% by weight.

6. The method of claim 5, wherein the sheet is heated to a temperature above 250° C.

7. The method of claim 5, and including the step of incorporating a wetting agent in the amount up to 2% in the ink composition.

8. The method of claim 5, and including the step of binding a plurality of said masters together in booklet form, with adjacent masters being in contiguous contact without separating sheets.

9. The method of claim 5, wherein said sheet is a supercalendered translucent sheet of paper free of coating materials.

10. The method of claim 9, wherein said paper sheet has an opacity less than 79%, a density in the range of 1.05 to 1.16 gr/cc and a surface roughness index less than 2.01 $h \times 10^4$ cm.

11. A liquid ink composition for use in preparing spirit duplicating masters, consisting essentially by weight of 40% to 62% of a dye, 40% to 65% of an alcohol soluble polyamid resin having a melting point in the range of 100° C. to 125° C., and 12% to 25% of ethylene glycol, said resin being miscible with ethylene glycol and serving as a carrier to disperse said dye.

12. The composition of claim 11, and including up to 2% by weight of a wetting agent.

13. The ink composition of claim 12, wherein the dye is selected from the group consisting of crystal violet, methyl violet, and mixtures thereof.

14. The ink composition of claim 12, wherein the wetting agent is a fatty acid having from 12 to 20 carbon atoms in the molecule.

* * * * *

UNITED STATES PATENT AND TRADEMARK OFFICE

CERTIFICATE OF CORRECTION

PATENT NO. : 4,206,937

DATED : June 10, 1980

INVENTOR(S) : DONALD B. HUSTON

It is certified that error appears in the above-identified patent and that said Letters Patent are hereby corrected as shown below:

Column 6, Claim 5, line 23, Cancel "of" first occurrence and substitute therefor ---on---.

Signed and Sealed this

*Ninth* Day of *September 1980*

[SEAL]

*Attest:*

SIDNEY A. DIAMOND

*Attesting Officer* *Commissioner of Patents and Trademarks*